UNITED STATES PATENT OFFICE.

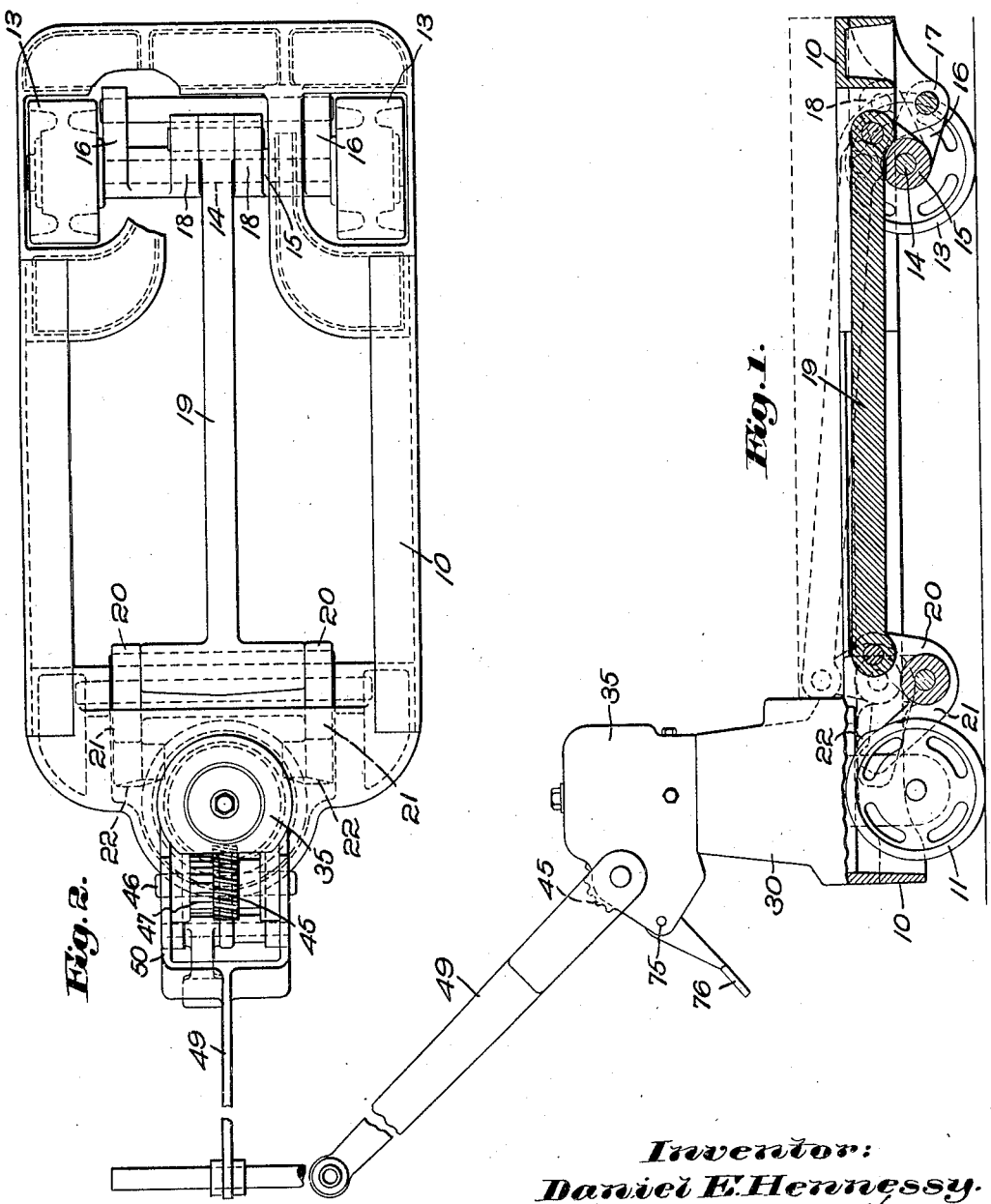

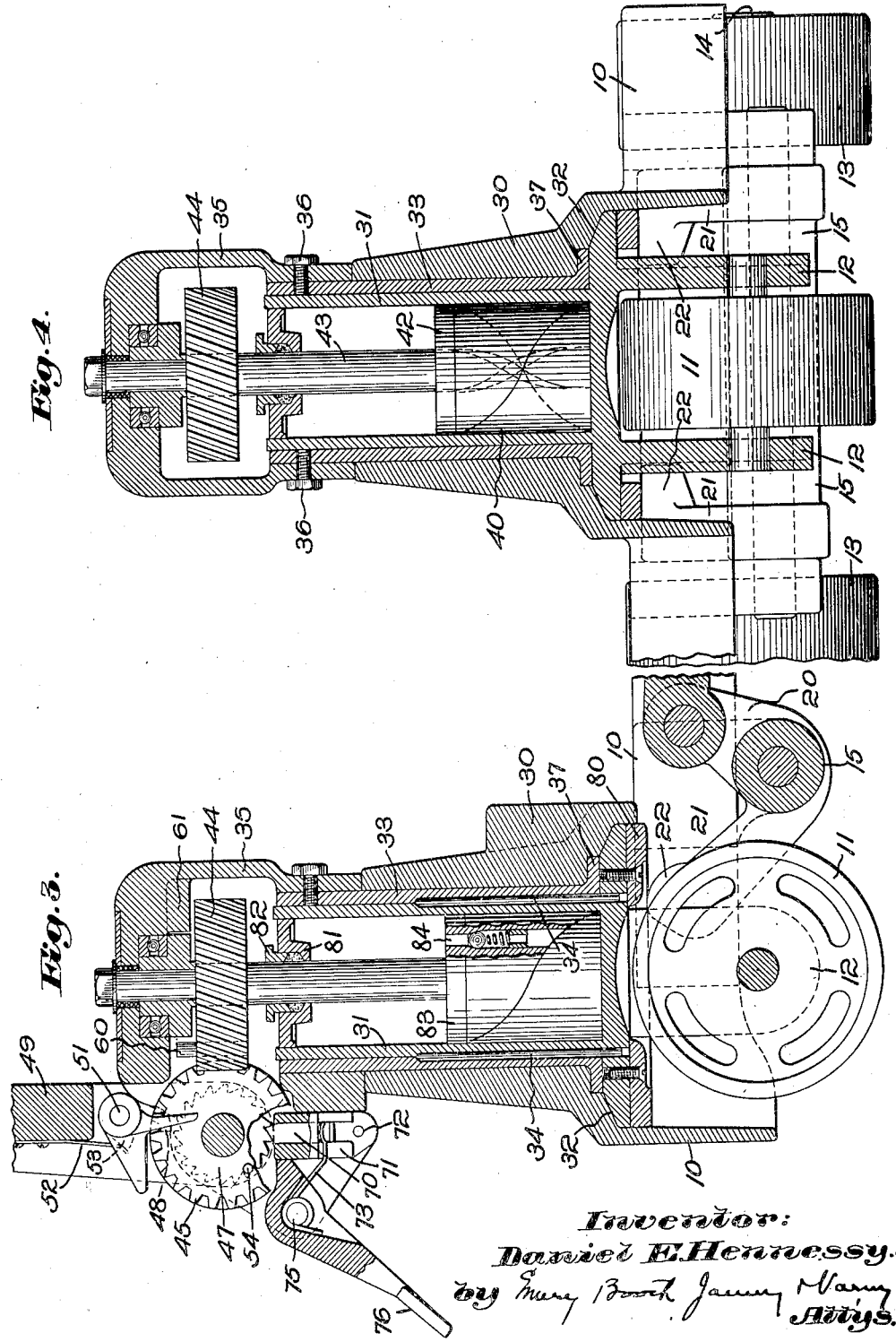

DANIEL E. HENNESSY, OF HOLYOKE, MASSACHUSETTS, ASSIGNOR TO THE STURDI-TRUCK COMPANY, OF NORTHAMPTON, MASSACHUSETTS, A CORPORATION OF MASSACHUSETTS.

WHEELED ELEVATING DEVICE.

1,359,372.  Specification of Letters Patent.  Patented Nov. 16, 1920.

Application filed September 12, 1917. Serial No. 190,891.

*To all whom it may concern:*

Be it known that I, DANIEL E. HENNESSY, a citizen of the United States, and a resident of Holyoke, in the county of Hampden and Commonwealth of Massachusetts, have invented an Improvement in Wheeled Elevating Devices, of which the following description, in connection with the accompanying drawings, is a specification, like characters on the drawings representing like parts.

This invention relates to wheeled elevating devices, and more particularly to elevating trucks, the object being to produce a simple, efficient construction possessing various advantages over the prior art.

The invention will be best understood by reference to the following description when taken in connection with the accompanying illustration of one specific embodiment thereof, while its scope will be more particularly pointed out in the appended claims.

In the drawings:

Figure 1 is a side elevation partly in longitudinal section showing an elevating truck embodying one form of the invention;

Fig. 2 is a plan view of the truck shown in Fig. 1;

Fig. 3 is a central, longitudinal section in elevation showing parts associated with the steering head; and Fig. 4 is a transverse, sectional elevation of the same portion of the truck.

Referring to the drawings, and to the embodiment of the invention which I have there selected for illustration, the truck there shown comprises a single, load-supporting frame or platform 10 of generally rectangular outline mounted upon suitable wheeled supports. The forward end of the truck is mounted upon a wheeled support consisting of the single wheel 11 journaled in the forked member 12 (Fig. 3). The rear wheeled supports comprise the two truck wheels 13, 13 secured to the axle 14.

To elevate the load sustaining platform, the rear end of the platform has an eccentric connection to the rear truck wheels 13, such connection consisting herein of the sleeved member 15 in which the axle 14 is journaled, the sleeve 15 being provided with pairs of bell crank arms, one set of which, 16, 16, has jointed connection to the depending ears 17 on the platform, and the other set of which, 18, 18, has jointed connection to the forwardly extending reach rod 19. The relation of these parts is such that if the reach rod is drawn forward, the eccentric connection is turned, swinging up the bell crank arms 16, 16 and elevating the rear end of the platform with relation to its wheeled supports, the platform assuming some such position as is represented by the dotted lines in Fig. 1. Opposite movement of the reach rod is accompanied by a lowering movement of the platform from the dotted-line position to the full-line position shown in Fig. 1.

At its forward end, the reach rod 19 has jointed connection to the arms 20 of a front bell crank member, the inclined bell crank arms 21 terminating in a cam-shaped member 22 which is adapted to coöperate with the elevating devices for the front end of the truck to cause the simultaneous elevation of the rear end of the truck when the front end is lifted.

Referring now to the elevating and steering devices at the forward end of the truck, the latter is provided with a platform or steering head 30 which is herein rigidly connected to the platform 10. To provide a swivel support between the platform and the wheel, the wheel fork 12 is provided with an upwardly extending sleeve-shaped member 31 having a flanged head 32 just above the wheel fork on which the steering head 30 receives swiveling support.

The steering head is free to turn about the upright sleeve 31 and rests on the flanged head 32 in the lowered position of the platform. Under the action of suitable lifting devices, however, the steering head and platform are capable of being raised or lowered with relation to the upright sleeve. To provide for the lifting movement, there is herein provided the intermediate lifting sleeve 33 non-rotatably fixed with relation to the upright sleeve 31 by any suitable means such as the pins or keys 34, but capable of sliding movement with relation thereto. The intermediate sleeve 33, at its upper end, is non-rotatably fixed also with relation to the cap piece 35 by means of screws 36 or other suitable fastening devices. The cap piece, intermediate sleeve and upright sleeve, with the supporting wheel 32, therefore, turn as a unit. The intermediate sleeve and cap piece, however, while rotatable with relation to the steering head 30, are longitudinally fixed with relation thereto in virtue of the flanged end 37 provided upon the intermediate sleeve and countersunk into the lower end of the steering head, and the abutting engagement of the cap piece 35 with the upper end of the steering head. The cap piece and intermediate sleeve, therefore, while turning as a unit with the wheeled support, are adapted to move longitudinally and raise or lower as a unit with the platform or steering head.

To raise or lower the steering head upon the upright sleeve member, any suitable means may be employed, but herein means is provided which has a combined rotary and longitudinal movement and consists specifically of one or more movable spiral incline members in coöperative engagement with one or more fixed spiral incline members. As shown in the drawings (Figs. 1 and 2), a pair of fixed spiral inclines 40 are located in the bottom of the upright sleeve member 31 and adapted to coact with a pair of suitably shaped spiral inclines 42, the latter secured to the upright shaft 43. When the shaft 43 is turned, the upper inclines are turned upon the lower fixed inclines, and, together with the shaft, are screwed along the fixed incline and lifted from the full-line position shown in the drawings. The upper end of the shaft 43 is suitably journaled in the cap piece 35, so that its longitudinal movement carries with it the cap piece, together with the intermediate sleeve and steering head 30, thereby lifting the platform with relation to the wheeled support.

To turn the shaft, any suitable means may be provided, but herein I have shown the skew gear 44 on the shaft driven by an intermeshing gear 45, the latter mounted on a short shaft or pintle 46 also supported in the cap piece 35. The gear 45 may be turned in any desired way, but herein it is given a step-by-step movement by a ratchet and pawl device, the latter consisting of the toothed ratchet wheel 47 fixedly secured to the gear 45 and adapted to be engaged by the pawl 48 carried by the hand lever 49. The lever 49 has the bifurcated or forked portion 50 by which it is swiveled on the pintle 46, so that it may be given an intermittent, oscillatory movement about the ratchet. The pawl 48 is pivoted on the pin 51 mounted in the forked portion 50 of the hand lever, and is pressed into engagement with the teeth of the ratchet by the spring 52. The spring 52 engages a raised portion 53 on the pawl, so that the latter can be given a partial turn right-handedly, as viewed in Fig. 3, and thrown out of engagement with the ratchet when desired and maintained in that position by the spring.

The lifting of the platform is effected by ratcheting the gear 45 around by an oscillating movement of the hand lever 49. When the platform is completely lifted, a pin 54 moves into engagement with a finger 55, which latter is secured to the pawl 48, turning the pawl out of engagement with the ratchet. A supplementary stop is also provided in the form of a pin 60 which is adapted to engage with a stop lug 61 on the cap piece 35 when the platform has reached an elevated position.

To provide means for automatically holding the platform elevated at any point to which it has been raised, but permitting its release to lower it when desired, the locking pawl 70 is utilized, this being carried in the guide piece 71 pivotally mounted upon the cap piece 35 at the point 72. The pawl 70 is spring-pressed into engagement with the teeth of the ratchet by means of the spring 73, and the guide piece 71 is normally held in an upright position by the pressure of the catch or latch 74 pivoted to the cap piece 35 at the point 75. The spring 73 normally exerts a tendency to hold the latch in the position shown, but the latter may be turned left-handedly (as viewed in Fig. 3) by pressure on the foot treadle 76, thus acting to withdraw lateral support from the guide piece 71. This permits the backward thrust of the ratchet to turn the guide piece and move the pawl out of locking relation, allowing the ratchet to turn reversely and the movable spiral inclines 42 to descend and the truck platform to be lowered. The locking pawl and the latch lever will automatically swing back into place when the platform has been lowered to its lowest position or after further elevating movement is attempted.

It will be seen that the forward end of the truck is lifted by a linear, vertical lifting movement. As indicated by dotted lines in Fig. 1, lifting movement of the front end of the platform carries with it the bell crank 20 which is pivoted thereon. This causes the cam member 22 to press against the hard annular contact plate 80 secured to the flange 32 of the upright wheel support, and, as the lifting movement continues, this swings the bell crank on its axis, drawing the reach rod 19 forward and lifting the rear end of the truck simultaneously and equally with the forward end thereof. When the platform is fully elevated, the rear bell cranks 16 assume positions which bring the jointed connection to the depending ears 17 in a substantially vertical line over their position when the truck is lowered, so that the lifting movement of the rear end of the truck, as well as the forward end, is in a substantially vertical direction.

While I have herein shown a mechanical agency for effecting the lifting movement, to wit, the coacting spiral inclines, I preferably associate with these a check device in the form of a liquid check. To provide such liquid check herein, the upright sleeve member 31 is in the form of a cylinder, the upper end being closed by the head 81 provided with a stuffing box 82 through which the shaft 43 passes. The movable, spiral incline 42 has connected thereto the plunger 83 which serves as a piston, and the space above the piston 83 is filled with some suitable liquid, such as oil. As the movable incline is turned upon the fixed incline and the piston 83 moves upward in the oil chamber, the oil passes into the gradually increasing space below the movable incline, either through leakage or clearance spaces provided, or through other suitable valved passages, such as the valve-controlled passage 84. When the raised platform is allowed to descend, the body of oil between the inclines will check its descent, the oil escaping slowly through the clearance spaces about the piston 83 into the upper oil chamber and allowing a slow, gradual descent of the platform. The use of an upright check cylinder prevents the formation of air bubbles and the resultant trouble from such air bubbles in the case of check cylinders placed in an approximately horizontal position wherein the checking action is apt to be withdrawn and the platform suddenly dropped.

It will be seen that the handle 49 being swiveled upon the cap piece 35, may be turned to any position about the upright steering axis, while at the same time being available in any such position to effect the lifting movement of the platform.

The construction herein described not only provides a simple but effective and powerful elevating truck, but permits the deposition of the load close to the steering head. This not only permits the maximum dimension of the truck to be availed of for carrying the load and increases the load-carrying capacity, but brings the load close to the front wheeled support, so that the truck may be hauled up or down a sharp incline without dragging the sides of the frame which are ordinarily used in supporting the loads carried by this type of truck.

While I have herein shown one form of my invention embodied in an elevating truck, many of the features thereof may be embodied in a wheeled lifting jack, such, for example, as might consist of a steering head with its front wheeled support only, the lifting frame comprising a toe or foot secured to the steering head and adapted to be placed under and elevate one end of the load only.

Other applications with the generic features of the invention, may be made, and while I have herein shown and described for purposes of illustration one specific form of the invention, it is to be understood that the same may be varied as to the form, construction and relative arrangement of the parts without departing from the broad spirit thereof.

Claims.

1. In an elevating truck, the combination with an elevating frame of a wheeled support adapted to turn about an upright axis in said frame and lifting means including a lifting tongue and step-by-step mechanism actuated thereby to lift the frame on said support.

2. In an elevating truck, the combination with an elevating frame of a wheeled support adapted to turn about an upright axis in said frame and lifting means to lift the frame on said support including a lifting tongue and step-by-step mechanism actuated thereby, said lifting means being adapted to turn with said wheeled support.

3. In an elevating truck, the combination with a supporting frame having front and rear wheeled supports, means for elevating the front end of the frame on its wheeled support, a movable connection between the rear wheels and the rear part of the frame, a reach rod for turning said connection to elevate the rear end of the frame, and a bell crank carried by the front end of the frame for moving said reach rod, said bell crank being engaged by the front wheeled support to move its reach rod when the front end of the frame is elevated, said elevating means being arranged to turn about a vertical axis.

4. In an elevating truck the combination with a frame member having front and rear wheeled supporting members, elevating means for elevating one end of the frame member relative to its supporting wheels, an actuator for said elevating means located at the opposite end of the frame member, an elevating device for elevating the said opposite end of the frame member on its wheeled supporting member, the actuator being carried by and movable on one of said members and the said elevation causing said actuator to engage with the remaining member and be moved thereby to elevate the first mentioned end of the frame member on its wheeled supporting member.

5. In an elevating truck, the combination with a frame having a steering head, of a wheeled support for one end of the frame having a swiveled connection in said steering head, a wheeled support for the opposite end of the frame and combined lifting and steering means swiveled on said steering head for lifting equally both ends of the frame on its wheeled supports.

6. An elevating truck having a combined steering head, check and lifting jack.

7. An elevating truck having a front wheeled support and a rear wheeled support, a combined lifting and steering handle, a frame swiveled about an upright axis on the front wheeled support, means actuated by said handle and including step by step lifting mechanism for lifting the frame by lifting it on its swivel and means for simultaneously lifting the frame on its rear wheeled support.

8. In an elevating truck, the combination with a supporting and lifting frame having front and rear wheeled supports, the front support being adapted to turn about an upright axis in said lifting frame for steering the truck, means mounted on the frame, and including devices adapted to turn about the steering axis with the front wheeled support, for elevating both ends of the frame simultaneously and equally.

9. In an elevating truck, the combination with an elevating frame of a wheeled support adapted to turn about an upright axis in said frame and lifting means including a lifting tongue adapted to turn with the wheeled support, toothed lifting mechanism, locking means to hold said frame when lifted, said tongue being disengageable from said lifting mechanism but operatively connectible therewith to lift the frame step-by-step.

10. In an elevating truck, the combination with a frame, of wheeled supports therefor, means for elevating the frame on the wheeled supports, and a lifting jack for said elevating mechanism, including an upright, liquid-containing, check cylinder.

11. In a wheeled elevating device, a wheeled support, a lifting frame, and an elevating mechanism for lifting the frame on the support, including a liquid check device comprising a liquid chamber and a plunger therein having both a rotary and a longitudinal movement, and coöperating means for transmitting such rotary movement to said frame as lifting movement.

12. A wheeled elevating device comprising a wheeled support, a lifting frame, and elevating mechanism for elevating the frame on the support, including a liquid check device having a liquid chamber and a plunger therein provided with both a vertical and a rotary movement, and coöperating means for transmitting such rotary movement to said frame as lifting movement.

13. A wheeled elevating device comprising a wheeled support, a lifting frame, and lifting means including a liquid check device having a liquid chamber and a mechanically acting lifter working in said chamber.

14. An elevating truck having front and rear wheeled supports, a lifting frame connecting the front and rear wheeled supports and leaving the space between the front and rear wheeled supports and beneath the lifting frame open and unobstructed, a movable connection between the frame and the rear wheeled support, elevating means for the front end of the frame adapted when actuated also to move the movable connection and to lift the rear end of the frame, and a combined steering and lifting handle adapted to steer the truck in either the elevated or lowered position of the frame.

15. A wheeled truck having a frame, wheeled supports for opposite ends, a lifting device for lifting one end of the frame with relation to its wheeled support, a lifting device for the opposite end, and means carried by and movable on the frame and actuated by engagement with said wheeled support as the adjacent end of the frame is lifted for actuating the lifting device for the said opposite end.

16. A wheeled elevating device comprising a wheeled support, a lifting frame, a swiveled connection between the lifting frame and the wheeled support, and consisting of an upright member, a sleeve non-rotatably secured to the upright member but vertically movable thereon, a head on the frame within which the sleeve and upright member have a turning movement, said head being connected to move vertically with the sleeve, and step-by-step lifting means to lift the head and sleeve on the upright member.

17. An elevating truck having a platform, wheeled supports for both ends, a lifting connection between one support and the platform, elevating means to lift an end of the platform thereon, and means mounted on the platform and adapted to be actuated by the elevation of the latter for actuating said lifting connection.

18. A wheeled elevating device, comprising a wheeled support, a lifting frame, a swiveled connection between the lifting frame and the wheeled support and consisting of an upright member in the form of a sleeve secured to the wheeled support, a head on the frame within which the upright member has both a turning and a sliding movement, means to lift the head on the wheeled support, comprising a spiral incline carried by the upright sleeve member, a coacting spiral incline adapted to turn thereon, an upright shaft for turning the same, a cap piece in which said shaft is journaled, a sleeve intermediate the head and the upright sleeve member secured to said cap piece, being rotatably fixed with relation to the upright sleeve member but movable longitudinally thereon with the head, whereby the turning movement of said coacting incline effects the lifting of the cap piece, intermediate sleeve and head on the upright sleeve member, a liquid check comprising a liquid chamber contained within the sleeve in which the coacting spiral inclines operate having one or more valved passages for permitting the passage of the liquid to opposite sides of the coacting spiral incline, and means for turning the incline to raise or lower the frame, including a handle connected to the cap and adapted also to turn the wheeled support.

19. An elevating truck comprising an elevating frame, a wheeled support adapted to turn relative thereto, an intermediate member vertically fixed but rotatably movable with respect to the frame and rotatably fixed but vertically movable with respect to the support, and elevating means for elevating the frame, the same including a lifting lever and step-by-step lifting mechanism acting through the intermediate member and actuated by the reciprocations of the lifting lever to raise the frame on the support.

20. An elevating truck comprising an elevating frame, a wheeled support adapted to turn relative thereto, an intermediate member vertically fixed but rotatably movable with respect to the frame and rotatably fixed but vertically movable with respect to the support, and elevating means for elevating the frame, the same including step-by-step lifting mechanism connected to the intermediate member, a lifting lever disengageable therefrom but adapted to be reciprocated in operative connection therewith to actuate the lifting mechanism and raise the frame on the support and locking means to lock the frame when lifted.

21. An elevating truck having wheeled supports at the opposite ends thereof, a main frame constituting both an elevating frame for the load and a connecting frame for the wheeled supports, a steering head in the front end of the frame, an upright member in the form of a sleeve secured to the front wheeled support and swiveled in the steering head, the latter being capable of a lifting movement with relation to said upright member, a sleeve intermediate the head and upright sleeve member rotatably fixed with relation to the latter to turn therewith to partake of the lifting movement of the head, a steering handle mounted on said sleeve to turn the wheeled support and steer the truck, means on said steering head and actuated by said handle for lifting the steering head and main frame relatively to said wheeled support, a liquid check comprising a liquid chamber contained within the upright sleeve and a piston therein connected to the main frame, a movable connection between the rear wheeled support and the frame, movement of which is adapted to raise the latter, and means controlled by the lifting of the front end of the frame to move said connection and simultaneously lift said frame on said rear wheeled support, said means including a link for moving said connection and a member carried by the frame for moving said link and lifted with said frame to engage a part on the front wheeled support and move said link.

22. An elevating truck having wheeled supports at the opposite ends thereof, a main frame constituting both an elevating frame for the load and a connecting frame for the wheeled supports, a steering head in the front end of the frame, an upright member secured to the front wheeled support and having swiveled connection with the steering head, the latter being capable of lifting movement with relation to said upright member, means for lifting the front end of the frame with relation to said upright member, the same including interengaging step-by-step lifting devices, means for simultaneously lifting the rear end of the frame on its wheeled support, and a vertically movable lifting handle engageable with said lifting means to actuate the same and disengageable therefrom when the frame is lifted to the desired extent, said handle being connected also to turn the forward wheeled support and steer the truck.

23. An elevating truck having wheeled supports at the opposite ends thereof, a main frame constituting both an elevating frame for the load and a connecting frame for the wheeled supports, a steering head on the front end of the frame, an upright member secured to the front wheeled support having a swiveled connection with the steering head, the latter being capable of lifting movement with relation to said upright member, means carried by the steering head for lifting the latter with relation to said upright member, the same including step-by-step lifting devices, and a combined lifting and steering handle for actuating said lifting means by vertical reciprocation.

24. An elevating truck having an elevating frame, a steering head thereon, a wheeled support having an upright member swiveled in said steering head, a combined steering and lifting handle connected to lift said steering head on said upright member step-by-step lifting mechanism operated by the reciprocatory movement of the handle, and means simultaneously for lifting the opposite end of said frame.

25. An elevating truck having the wheeled supports 11 and 13, the elevating frame 10, the steering head 30, the upright member 31 associated with said support 11 and having a swiveled connection to the head, and a combined lifting and steering handle 49 with lifting mechanism connected thereto coöperating with said member to lift the frame, said mechanism including the toothed members 47 and 48.

26. An elevating truck having wheeled supports at the opposite ends thereof, a main frame constituting both an elevating frame for the load and a connecting frame for the wheeled supports, a steering head for the front end of the frame, an upright member secured to the front wheeled support and having swiveled connection with the steering head, the latter being capable of a lifting movement with relation to said upright member, means for lifting the front end of the frame with relation to said upright member, and a liquid check in said steering head and comprising a liquid-containing cylinder and a piston therein, one connected to the frame and the other to the wheeled support.

27. An elevating truck having wheeled supports, an elevating frame, a swiveled connection between said frame and a wheeled support, means for elevating said frame with relation to said wheeled support, and a liquid check in said swiveled connection comprising a liquid-containing cylinder and a piston therein, one connected to the wheeled support and the other to the elevating frame.

28. An elevating truck having an elevating frame, a wheeled support having a swiveled connection in said elevating frame, a check comprising a fluid-containing cylinder and a piston, one connected to a wheeled support and the other to the frame, and means for elevating said frame about said cylinder.

29. An elevating truck having wheeled supports at opposite ends thereof, a main frame constituting both an elevating frame for the load and a connecting frame for the wheeled supports, the front wheeled support being adapted to turn about an upright axis relative to the frame, a handle mounted to turn with the front wheeled support to steer the truck, step-by-step lifting mechanism actuated by the vertical reciprocations of the handle to lift the frame relative to the front wheeled support, a movable connection between the rear wheeled support and the main frame, movement of which is adapted to raise the latter and means controlled by the lifting of the front of the main frame to move said connection and simultaneously lift said frame on said rear wheeled support.

30. An elevating truck having wheeled supports at the opposite ends thereof, a main frame constituting both an elevating frame for the load and a connecting frame for the wheeled supports, means for lifting said frame with relation to the front wheeled support, a movable connection between said frame and the rear wheeled support, movement of which is adapted to raise the former, and an actuator for said movable connection carried by the opposite end of the frame, a part carried by the wheeled support at said opposite end for engaging said actuator, whereby the lifting of said opposite end serves to move said connection and lift the rear end of said frame.

31. An elevating truck having wheeled supports at opposite ends thereof, a main frame constituting both an elevating frame for the load and a connecting frame for the wheeled supports, the front wheeled support being adapted to turn about an upright axis relative to the frame, a handle mounted to turn with the front wheeled support to steer the truck, lifting devices actuated by the vertical movements of the handle and adapted to turn with the front wheeled support and operable in different steering positions thereby to lift the frame relative to the front wheeled support, a movable connection between the rear wheeled support and the main frame, movement of which is adapted to raise the latter and means controlled by the lifting of the front of the main frame to move said connection and simultaneously lift said frame on said rear wheeled support.

32. An elevating truck having an elevating frame, a wheeled support swiveled therein, step-by-step lifting means for lifting said frame on said support, a combined lifting and steering handle mounted to turn with the wheeled support to steer the truck and movable vertically to lift the frame, and means apart from the handle to hold the frame lifted and leave the handle vertically free.

33. An elevating truck having an elevating frame, a wheeled support swiveled therein, step-by-step lifting means for lifting said frame on said support, and a combined lifting and steering handle mounted to turn the wheeled support and steer the truck but reciprocatively movable vertically to engage the lifting mechanism and lift the frame step-by-step.

34. An elevating truck comprising an elevating frame, a wheeled support adapted to turn about an upright axis relative to the frame and intermediate the member vertically fixed but rotatably movable with respect to the frame and rotatably fixed but vertically movable with respect to the support, and elevating means for elevating the frame, the same including step-by-step lifting mechanism connected to the intermediate member, a combined steering and lifting lever pivoted on the intermediate member and disengageable from the lifting mechanism but adapted to be reciprocated in operative connection therewith to actuate the same and raise the same relative to the support and locking means to lock the frame when lifted.

35. In an elevating truck, the combination with front and rear wheeled supports, of an elevating frame constituting a connection between said front and rear wheeled supports and leaving unobstructed and free the space between said supports and beneath said frame, mechanism to lift said frame with relation to said wheeled supports, said mechanism including means extending from the front wheeled support to the rear wheeled support and movable with the elevating frame, and a combined steering and lifting handle for actuating said mechanism, said handle being mounted to turn freely about an upright axis in either the elevated or depressed position of the frame.

36. In an elevating truck, the combination with an elevating frame, of a steering head, a wheeled support swiveled in said steering head, a member connected to lift with said platform and turn with said swiveled support, a combined steering and lifting handle pivoted on said member, and step-by-step lifting mechanism adapted to be actuated by the reciprocations of said handle.

37. A lifting truck comprising a head having a wheeled support, a lifting frame in which said head is swiveled, means associated with the head for lifting the frame relatively thereto, a wheeled support for the other end of the frame, and motion-transmitting connections movable relatively to the frame but carried and lifted thereby for concomitantly raising said other end relatively to the support thereby to provide an unobstructed space between the wheels.

38. A lifting truck comprising a frame, a swiveling front-wheeled support therefor, means for elevating the frame on the support, movable means adjacent the support actuated by the elevation of the frame, a rear wheeled support movably connected to the frame and connecting means between said movable means and said rear wheeled support operating substantially in the plane of the frame to move the rear wheeled support when the frame is lifted on the front-wheeled support.

39. In an elevating truck, load-supporting means, a wheeled support swiveled therein, a combined steering and lifting handle mounted to swing vertically and adapted to turn said swiveled wheeled support, means operated by the movement of said lever to raise said load-supporting means about its swiveling connection to said wheeled support and including two engaging toothed members, one connected to the wheeled support and the other adapted to move and lift said load-supporting means when said lever is moved vertically.

40. In an elevating truck, the combination with a lifting frame of a wheeled-support movable about an upright axis to steer the truck, a combined lifting and steering handle, step-by-step lifting mechanism actuated by the handle to lift the frame on the support and including a rotary member coaxially arranged with the wheeled support to transmit the step-by-step lifting action through its turning movement.

41. In an elevating truck, the combination with a lifting frame of a wheeled-support movable about an upright axis to steer the truck, a combined lifting and steering handle and step-by-step lifting mechanism actuated by the handle to lift the frame on the support and including an upright member having a step-by-step rotary movement and adapted to transmit the lifting force to the frame.

42. An elevating truck having a wheeled support, a load-supporting frame having a steering head bearing in which said support is adapted to turn for steering the truck, lifting mechanism for elevating the frame on the support and a liquid check to check the descent of the frame and contained within the steering head bearing.

43. An elevating truck comprising an elevating frame, a wheeled support adapted to turn about an upright axis relative to the frame, lifting mechanism, and a liquid check coaxial with the turning axis.

44. An elevating truck comprising an elevating frame, a wheeled support adapted to turn about an upright axis relative to the frame to steer the truck, lifting mechanism including step-by-step lifting devices, a lifting handle and a liquid check coaxial with the turning axis.

45. In an elevating truck, an elevating frame, a wheeled support adapted to turn about an upright axis relative to the frame, lifting mechanism including a tongue mounted to swing vertically, mechanical means operable by the vertical movement of the tongue for elevating said frame step-by-step, mechanical means for locking said frame in an elevated position, and a checking device to check the descent of the frame when the latter is unlocked and arranged coaxially with the turning axis.

46. An elevating truck comprising an elevating frame, a wheeled support swiveled in the frame, an intermediate member vertically fixed but rotatably movable with respect to the frame and rotatably fixed but vertically movable with respect to the support, elevating means including a lifting handle operatively connected through the intermediate member to lift the frame, and a check device having coöperating elements connected one to the support and the other to the intermediate member.

47. An elevating truck having wheeled supports at opposite ends thereof, a main frame constituting both an elevating frame for the load and a connecting frame for the wheeled supports, the front wheeled support being adapted to turn about an upright axis relative to the frame, a steering handle mounted to turn with the front wheeled support to steer the truck, means actuated by vertical movement of the handle to lift the frame relative to the front wheeled support, a liquid check comprising a cylinder connected to the front wheeled support and coaxial with its turning axis and a piston therein connected to the frame, a movable connection between the rear wheeled support and the main frame, movement of which is adapted to raise the latter, and means controlled by the lifting of the front end of the frame to move said connection and simultaneously lift said frame on said rear wheeled support.

48. An elevating truck comprising load-supporting means and a wheeled support adapted to turn about an upright axis, steering mechanism including a combined lifting and steering handle mounted to swing vertically, means operated by the movement of said lever and including two interengaging toothed members, one adapted to move and lift said load-supporting means when the latter is moved vertically, and a vertically-arranged check device having a piston and cylinder connected one to the frame and the other to the support.

49. An elevating truck comprising load-supporting means and a wheeled support with steering mechanism including a combined steering and lifting lever mounted to swing vertically, means operated by the movement of said lever to raise said load-supporting means including two engaging, toothed members, one adapted to move and lift said load-supporting means when the lever is moved vertically, connections between the lever and the wheeled support to turn the latter about an upright axis and a dash pot located in the steering axis.

50. In an elevating truck the combination with an elevating frame of a steering wheel and a steering support therefor on which the elevating frame is mounted, lifting means intermediate the frame and the steering support to lift the adjacent end of the frame, another wheel support for a remote portion of the frame, and means connected thereto and actuated by the first lifting means simultaneously to lift the remote end of the frame relatively to its wheel support.

51. In an elevating truck the combination with an elevating frame of a steering wheel having a steering support on which the elevating frame is mounted, lifting means intermediate the frame and the steering support to lift the adjacent end of the frame, a wheel support for the opposite end of the frame movable relatively to the latter to cause that end of the frame to lift, and means to move the wheel support to lift the opposite end of the frame simultaneously with the lifting of the first-named frame end.

52. An elevating truck having wheel supports at opposite ends thereof, the front wheel support having a steering member to permit the steering of the truck, a single frame constituting both an elevating frame for the load and a connecting frame for the wheel supports, means to lift the adjacent end of the frame relatively to the steering member, and means to simultaneously lift the opposite end of the frame.

53. An elevating truck having wheel supports at opposite ends thereof, a single main frame constituting both an elevating frame for the load and a connecting frame for the wheel supports, the front wheel support having a steering member to permit the steering of the truck, a combined steering and lifting lever mounted to turn with the wheel support, and means actuated thereby to lift the adjacent end of the frame relatively to the steering member and simultaneously lift the opposite end of the frame relative to its wheel support.

In testimony whereof, I have signed my name to this specification.

DANIEL E. HENNESSY.